(12) United States Patent
Price et al.

(10) Patent No.: US 8,665,476 B2
(45) Date of Patent: Mar. 4, 2014

(54) INTEGRATION OF PRE-PRINTED INSERT PAGE IMAGES WITH PRINT PREVIEWS

(75) Inventors: Stephen G. Price, Longmont, CO (US); Randell Rivadeneira, Broomfield, CO (US); David E. Stone, Seal Rock, OR (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 56 days.

(21) Appl. No.: 13/307,138

(22) Filed: Nov. 30, 2011

(65) Prior Publication Data

US 2013/0135663 A1    May 30, 2013

(51) Int. Cl.
*G06F 3/12*    (2006.01)

(52) U.S. Cl.
USPC ......... 358/1.15; 358/1.11; 358/1.13; 715/200

(58) Field of Classification Search
USPC ............... 358/1.15, 1.16, 400, 500, 1.19, 1.8
See application file for complete search history.

(56) References Cited

U.S. PATENT DOCUMENTS

| | | | |
|---|---|---|---|
| 6,775,023 B1* | 8/2004 | Fukunaga et al. | 358/1.15 |
| 7,359,084 B2 | 4/2008 | Nara et al. | |
| 7,599,086 B2 | 10/2009 | Nakagiri et al. | |
| 2006/0280538 A1* | 12/2006 | Barry et al. | 400/62 |
| 2007/0024872 A1* | 2/2007 | Salgado | 358/1.1 |
| 2007/0053001 A1 | 3/2007 | Huntley et al. | |
| 2007/0195361 A1* | 8/2007 | Tomomatsu | 358/1.15 |
| 2008/0151285 A1 | 6/2008 | Morales et al. | |
| 2008/0266596 A1* | 10/2008 | Sato | 358/1.15 |
| 2009/0080013 A1 | 3/2009 | Sato et al. | |
| 2010/0020363 A1 | 1/2010 | Yoshida et al. | |
| 2010/0060694 A1* | 3/2010 | Saito et al. | 347/19 |
| 2010/0182427 A1* | 7/2010 | Jiang | 348/135 |
| 2010/0214574 A1 | 8/2010 | Tamaki | |
| 2011/0032559 A1 | 2/2011 | Yanagawa | |

\* cited by examiner

*Primary Examiner* — Mark K Zimmerman
*Assistant Examiner* — Richa Mishra
(74) *Attorney, Agent, or Firm* — Duft Bornsen & Fettig LLP

(57) ABSTRACT

Systems and methods are provided for including sheet images of pre-printed inserts in a print preview for a print job. The system is operable to receive a print job, to receive a request for a print preview of the print job, and to rasterize logical pages of the print job to generate sheet images. The system is further operable to identify inserts to be integrated with printed versions of the sheet images of the logical pages, and to include sheet images of the inserts with the sheet images of the logical pages for the print preview.

20 Claims, 5 Drawing Sheets

INTEGRATION OF PRE-PRINTED INSERT PAGE IMAGES WITH PRINT PREVIEWS

RELATED APPLICATIONS

This application is related to commonly owned U.S. patent application Ser. No. 13/210,715, filed Aug. 16, 2011, entitled "LABELING INSERTED PAGES WITHIN PRINT PREVIEWS OF A PRINT JOB" which is hereby incorporated by reference.

FIELD OF THE INVENTION

The invention relates to the field of printing, and in particular, to print previews generated for printing systems.

BACKGROUND

In the field of printing systems, users desire that print jobs be consistently presented across a variety of printers and display devices. In order to ensure uniformity in presentation, print jobs include print data that is often defined according to uniform standards such as Page Description Languages (PDLs), which are meant to specifically indicate the positioning and structure of printed elements on a given page. Accompanying the print data may be a job ticket for processing the print data of the job and/or processing the printed pages of the job (e.g., stapling of the pages after print, hole-punching the pages, etc.).

Unfortunately, each printer or display may utilize different color schemes (e.g., RGB vs. CMYK), different resolutions, and different processing algorithms than its peers. This in turn means that the final product presented to a user by such devices may vary significantly. Because of this, users desire print previews that provide not only an indication of how the print job should appear according to the page description language, but also an indication of how the print job will actually be printed at a specific device. Print previews are typically generated by Raster Image Processors (RIPs) of a device that is intended to print a given job. These print previews reliably show how the print job will be printed, because they are generated by the image processing components of the device that will actually be printing the job.

Using such print previews, a user may discover problems with how a job will be printed or processed before the job is actually initiated at a printer. For high-volume or expensive print jobs, reviewing a print preview for a job before initiating printing can potentially save a great deal of money and time. Therefore, users desire methods and systems that enhance the functionality of print previews within printing systems.

SUMMARY

Embodiments described herein provide methods and systems capable of providing images of pre-printed inserted pages ("inserts") within a print preview for a print job. Thus, a user may quickly preview not only the printed pages of the print job itself, but also the pages intended for insertion into the print job (e.g., pre-printed cover pages, divider pages, and others indicated in a job ticket accompanying the print data). This in turn allows a user to detect and compensate for errors relating to inserts during the print preview process.

One embodiment is a system for including sheet images of pre-printed inserts in a print preview for a print job. The system is operable to receive a print job, to receive a request for a print preview of the print job, and to rasterize logical pages of the print job to generate sheet images. The system is further operable to identify inserts to be integrated with printed versions of the sheet images of the logical pages, and to include sheet images of the inserts with the sheet images of the logical pages for the print preview.

In another embodiment, the system is further operable to review a job ticket of the print job to determine locations to place the inserts among the printed versions of the sheet images, to correlate the determined locations with the sheet images of the inserts, and to place the sheet images of the inserts at the determined locations.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
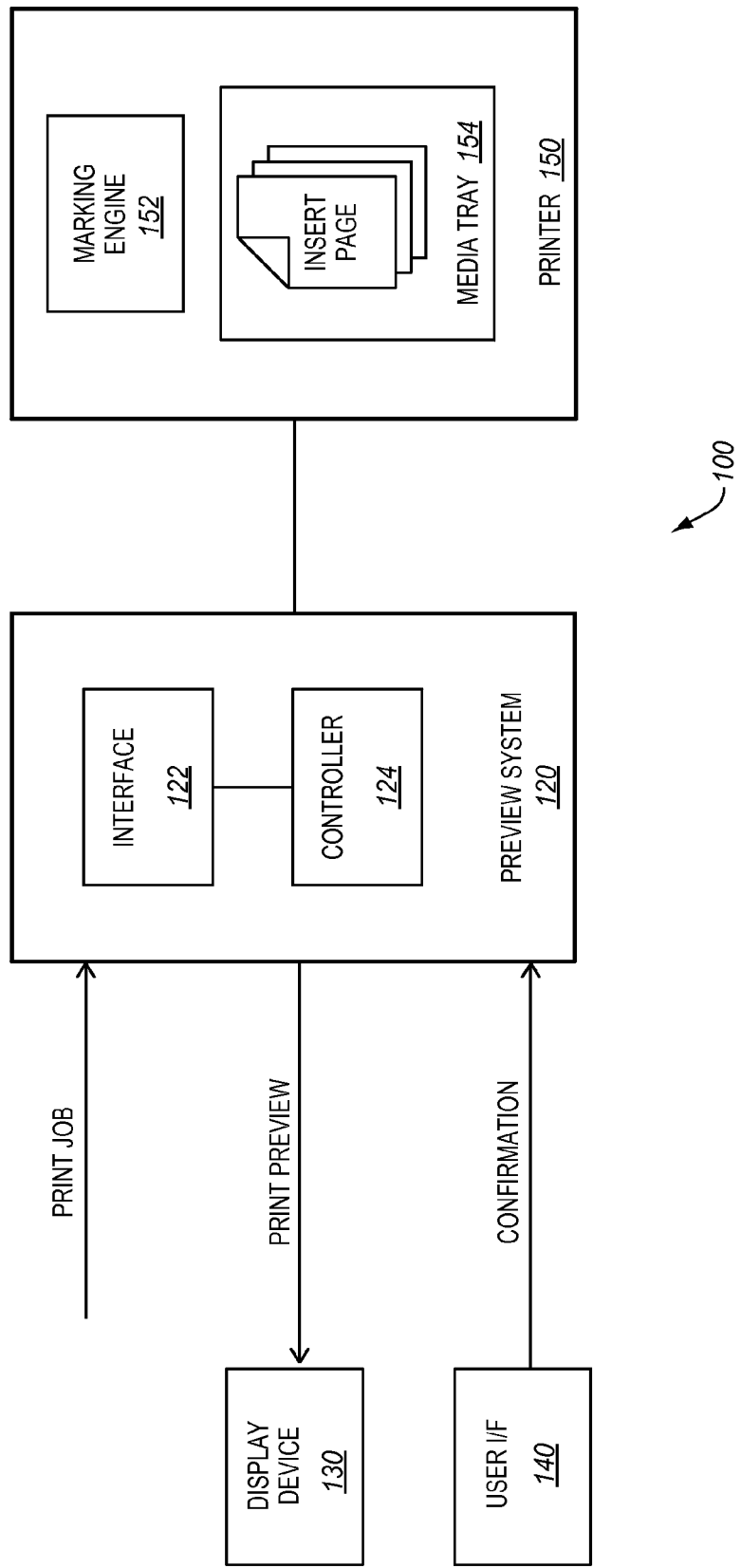
FIG. 1 is a block diagram of a printing system in an exemplary embodiment.

FIG. 1 is a block diagram of a printing system 100 in an exemplary embodiment. In this embodiment, printing system 100 includes preview system 120 coupled for communication with display device 130, user I/F 140, and printer 150.

Preview system 120 comprises any system, device, or component operable to generate previews for incoming print jobs. In particular, preview system 120 is enhanced to acquire sheet images of pre-printed pages for insertion into a print job (herein, "inserts") and integrate the sheet images of the inserts into the print previews for incoming jobs. In this embodiment, preview system 120 comprises interface 122 and controller 124. Interface 122 may receive and transmit print data and job instructions, and may further initiate communications with devices and components coupled with preview system 120.

Interface 122 therefore forwards information to and from controller 124, and may further translate incoming and outgoing information into formats compatible with the various elements of printing system 100. Controller 124 manages the operations of preview system 120. In one embodiment, controller 124 comprises a hardware processor implementing processing logic for generating previews for received print jobs.

Preview system 120 may be implemented, for example, as an independent server providing services to multiple users, as an application residing at a user device (e.g., as a hardware processor implementing logical instructions for host software), or even as an integrated component of a printer (e.g., as a print controller). When integrated as a printer component, it is a relatively simple process for preview system 120 to use Raster Image Processors (RIPs) of the attached printer in order to generate print previews for incoming jobs.

Display device 130 comprises any system, device, or component operable to display images to a user. For example, display device 130 may comprise a monitor, laptop, tablet, screen, etc. Display device 130 is operable to display print previews for a print job to a user, enabling the user to review the print previews for errors or discrepancies that might cause problems during the printing process. Display device 130 may, for example, be located at a printer console, at a client computer, or at some other computing device in communication with preview system 120.

User interface (I/F) 140 comprises any system, component, or device for a user to communicate with preview system 120. For example, user I/F 140 may comprise keyboards, mice, touch screen interfaces, microphones, etc. User I/F 140 may be used to provide a confirmation indicating that a user has reviewed the print preview and approved the job for printing. User I/F 140 may, for example, be located at a printer console, at a client computer, or at some other computing device in communication with preview system 120.

Printer 150 comprises marking engine 152 and media tray 154. Marking engine 152 comprises any combination of printing machinery (e.g., cut-sheet or continuous-sheet printing machinery) operable to mark an image onto a sheet. Marking engine 152 may, for example, use toner or ink to mark an image onto a sheet. When print previews are generated by controller 124 for viewing at display device 130, the print previews are intended to indicate how marking engine 152 will actually print the job onto physical sheets of media, and further to indicate how inserts stored at media tray 154 will appear among the printed sheets of the job. Preview system 120 may provide rasterized print data for a print preview to marking engine 152 for printing. However, marking engine 152 may receive the rasterized print data from other sources (e.g., a print server or client, a Raster Image Processor (RIP) coupled with marking engine 152 at printer 150, etc.).

Using printing system 100, a user may view a print job as it will actually be printed at printer 150. Furthermore, the user may also view how inserts will be placed among the pages of the print job during the printing process. Because of this, the user may quickly and easily detect potential errors in the print job (e.g., misplaced inserts, misaligned inserts, the wrong insert being used, etc.).

Further details of the operation of printing system 100 will be discussed with regard to FIG. 2. Assume, for this embodiment, that preview system 120 receives a print job for printing from a user. Further, assume that preview system 120 receives a request to review a print preview before printing the job.

Figure 2:
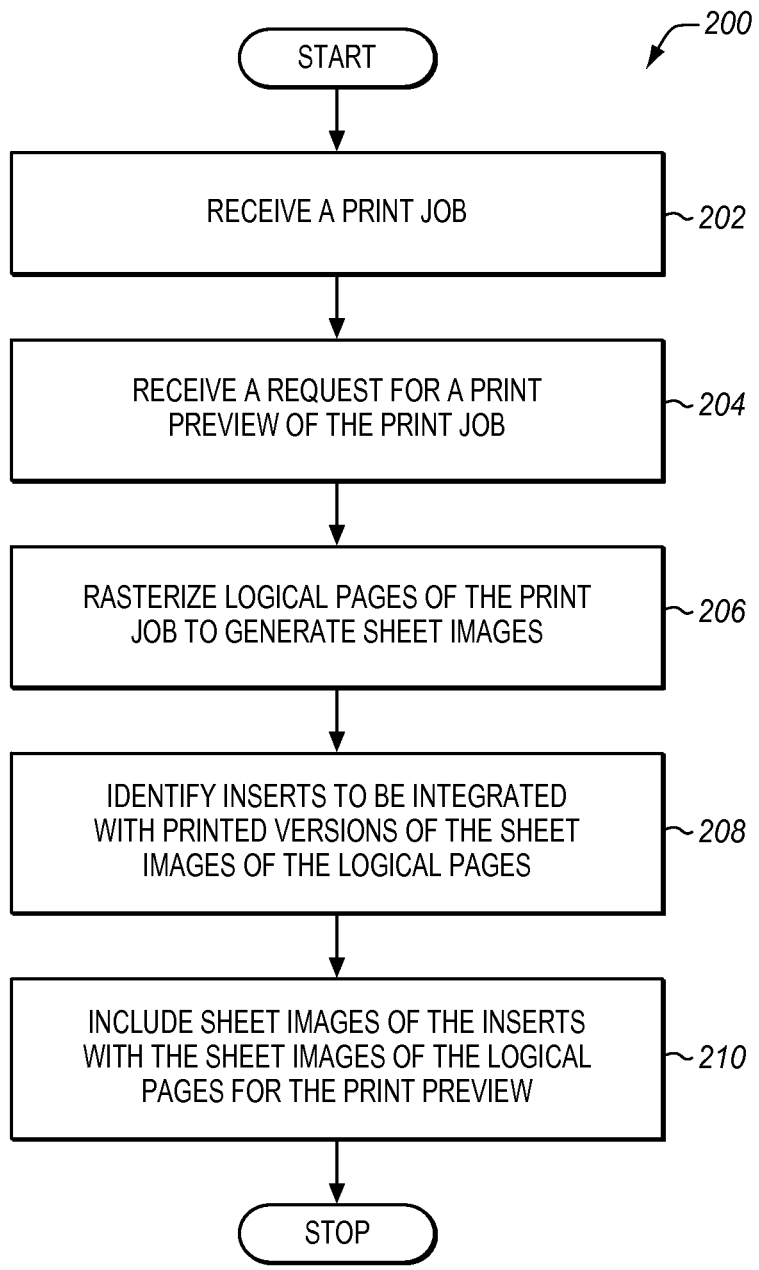
FIG. 2 is a flowchart illustrating a method for including sheet images of inserts within print previews in an exemplary embodiment.

FIG. 2 is a flowchart illustrating a method 200 for including sheet images of pre-printed inserts within print previews in an exemplary embodiment. The steps of method 200 are described with reference to printing system 100 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, interface 122 of preview system 120 receives a print job (e.g., from a print server or client) and provides it to controller 124. The print job may include logical pages of print data encoded according to a Page Description Language (PDL) such as PostScript. The print data may be accompanied by a job ticket or other metadata that includes instructions for inserting pre-printed pages among printed versions of print data. For example, an insert may be placed after page four of the print job, or before page seven of the print job. In another embodiment, a job ticket is rendered unnecessary by the existence of placeholder pages placed within the print job. Each placeholder is associated with an insert. During printing, each placeholder of the job is recognized by printer 150. When printer 150 recognizes the placeholder, printer 150 selects the insert related to the placeholder and physically places it among the printed pages of the job.

Inserts may, for example, be custom pre-printed sheets used to indicate boundaries within a print job. The inserts may be kept at a specific tray available to a printer for the print job. Inserts are distinct from print data because inserts are not data received for printing at a marking engine, but are rather physical pre-printed pages to be inserted among the physical printed pages of a print job. Because the inserts are pre-printed, the print data itself does not include instructions for printing on the inserts, nor does the print data include instructions for generating rasterized versions of the inserts. With these distinctions in mind, it can be understood that inserts are placed among printed pages of the job, and are not a part of the print data at the time of a job's submission for rasterization and printing.

In step 204, interface 122 receives a request for a print preview and provides the request to controller 124. This request may be provided, for example, via user I/F 140 or via a job ticket accompanying the print job. In one embodiment, a print server provides the request to interface 122. In step 206, controller 124 rasterizes the logical pages of the print job to generate sheet images. Typically, controller 124 will utilize one or more Raster Image Processors (RIPs) operating in serial or parallel to generate rasterized sheet images for the logical pages.

In step 208, controller 124 identifies inserts to be integrated with printed versions of the sheet images for the print job. In one example, controller 124 may review a job ticket for the print job to determine names (e.g., tags, numbers, identifiers, etc.) for the inserts. In another example, the inserts to be integrated are selected by a user via user I/F 140. Controller 124 may further identify the location of each insert as being after or before specific pages of print data (e.g., based upon the job ticket or user input).

In step 210, controller 124 includes sheet images of the inserts with the sheet images of the logical pages for the print preview. For example, controller 124 may correlate identified names for inserts with image data for the inserts stored at a memory. The memory may reside internally at preview system 120, at a printer, or at a print server, and may reflect the number and type of inserts loaded (or anticipated to be loaded) at that printer. The image data stored at the memory can be used to acquire sheet images of the physical appearance of the inserts. In another example, the image data may be acquired from a print job of a print server or client (e.g., a received print job may include the image data for the inserts). Controller 124 may then integrate sheet images of the inserts with sheet images for the print data. This may be performed, for example, by re-sequencing the order of rasterized pages in the print preview so to place the sheet images of the inserts at their appropriate locations. In one embodiment, printer 150 is a monochrome printer, but the inserts for the print job are in color. Preview system 120 therefore generates a print preview of the print job that includes monochrome images of the logical pages of the print job and color images of the inserts. In this manner, the inserts may be viewed in color alongside the monochrome output of the printer.

The image data stored at the memory may exist in a variety of formats (e.g., as PDL definitions for the inserts, as rasterized images of the inserts, etc.). If the image data is already in a rasterized format (e.g., as one or more sheet images), it can immediately be included with the sheet images of the print preview. However, if the image data is stored in a PDL format (e.g., as a single-page, non-printing job located at the printer), controller 124 may utilize a RIP in order to generate rasterized sheet image(s) for the insert(s). Storing the image data in rasterized form at a memory will generally allow controller 124 to generate the print preview more quickly (as no rasterization processes are needed). In contrast, PDL formats take up less space in memory, but may require processing before sheet images for the inserts can be generated.

Controller 124 may further transmit the sheet images of the print preview to display device 130, via interface 122 of preview system 120. When the images for the inserts are included at their intended locations as identified by the job ticket, a user of printing system 100 may advantageously review the print job for any insert-related problems that may occur during the printing process. Correction of these problems before initiating printing of the job saves both material and labor costs for a user of printer 150.

EXAMPLES

In the following examples, additional processes, systems, and methods are described in the context of a printing system for generating print previews that include sheet images of pre-printed pages to be inserted during the printing process.

Figure 3:
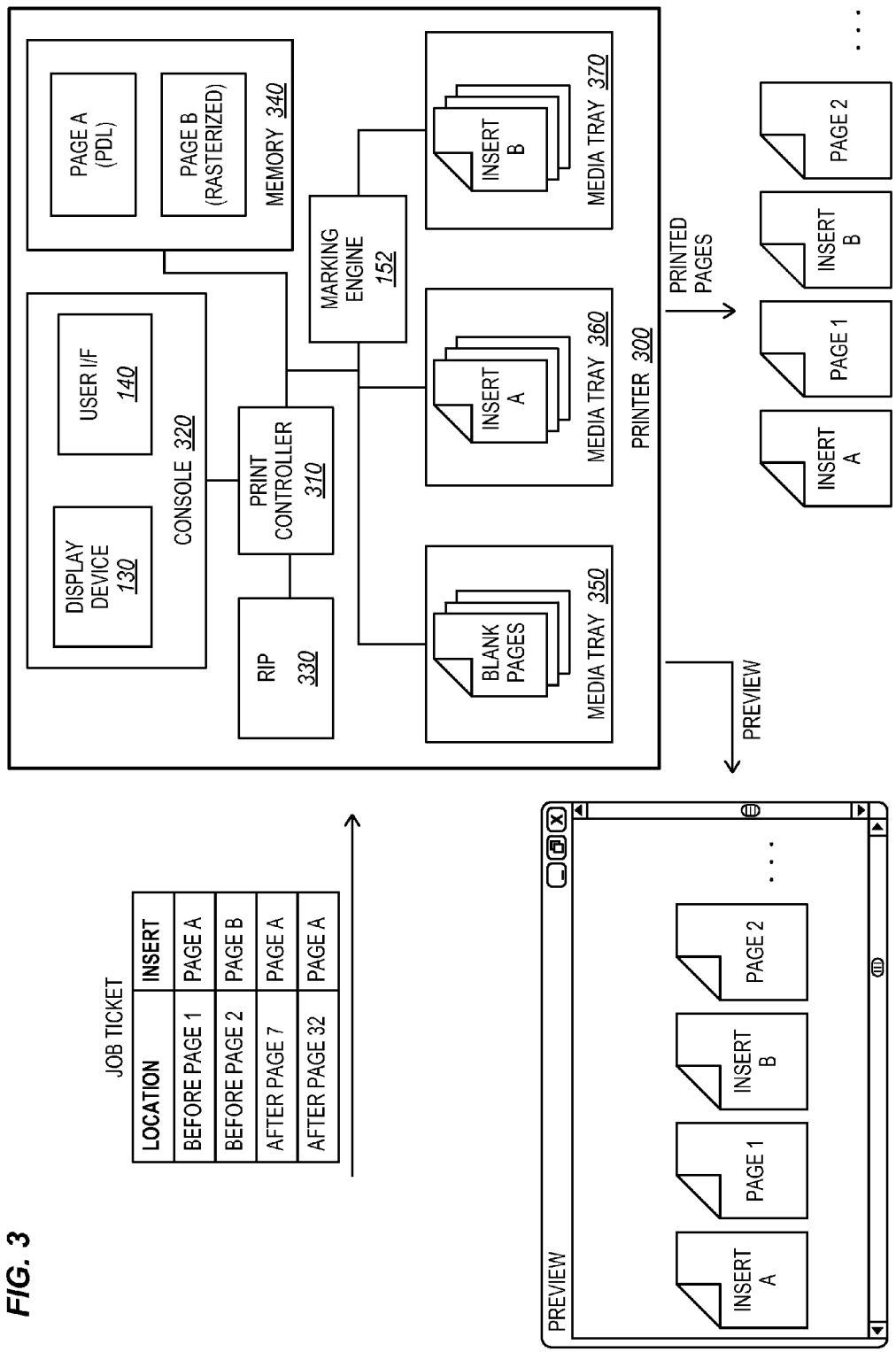
FIG. 3 is a block diagram of a printer implementing the method of FIG. 2 in an exemplary embodiment.

FIG. 3 is a block diagram of a printer 300 implementing the method of FIG. 2 in an exemplary embodiment. In this example, printer 300 comprises a high-volume printer capable of printing hundreds of pages per minute. Printer 300 includes print controller 310 coupled with console 320 (comprising display device 130 and user I/F 140), marking engine 152, RIP 330, and memory 340. In this embodiment printer 300 further includes multiple trays 350-370 that are filled with either copies of blank print media or pre-printed pages (inserts). Print controller 310 manages the operation of printer 300 as incoming print jobs are rasterized and printed. For example, print controller 310 manages rasterization, print preview, marking, and other processes.

Assume that print controller 310 receives a print job comprising print data and a job ticket. The job ticket indicates that a preview of the print job is requested. The job ticket further indicates that two different inserts ("page A" and "page B") will be inserted among the pages of the print job. Print controller 310 therefore initiates generation of a print preview for the job. Generating the print preview includes sending the print data of the print job to RIP 330 for rasterization. Print controller 310 additionally reviews the job ticket to identify the names and locations of inserts at the print job. Based on the review, print controller 310 determines that inserts are to be placed before page one, before page two, after page seven, and after page thirty two of the print job. Print controller 310 then correlates the names from the job ticket with names for sheet images of insert pages stored in memory 340. Thus, print controller 310 determines that image data for Page A is kept in memory in a PDL format, while image data for Page B is kept in a rasterized format. Therefore, print controller 310 instructs RIP 330 to rasterize Page A in order to generate a sheet image. If RIP 330 is not capable of rasterizing page A because Page A is defined by an unsupported PDL, then in one embodiment print controller 310 may identify an available device that is capable of rasterizing the PDL, and may request that the device rasterize Page A.

As rasterized sheet images of the print data are generated for the print preview by RIP 330, print controller 310 inserts rasterized sheet images of the inserts into the print preview. The sheet images of the inserts may be placed between sheet images of the logical pages, for example, based upon insertion instructions in the job ticket. Once the pages have been properly assembled and organized according to the instructions in the job ticket, print controller 310 transmits the print preview to display device 130, located at console 320. The print preview includes images of the insert pages as they will appear among the pages of the print job. A user reviews the print preview, and determines that the print job is ready for printing. Therefore, the user provides a confirmation message to print controller 310 via user I/F 140, also located at console 320.

Print controller 310 receives the confirmation and re-rasterizes (via RIP 330) the print job at full resolution. This full-resolution print data is then sent to marking engine 152 for printing, along with instructions for hardware elements of printer 300 to place the inserts at their appropriate locations among the pages of the print job. The physically printed pages of the job, combined with the inserts, are then presented to a user at an output tray of printer 300. In an alternative embodiment, print controller 310 utilizes the already-rasterized data of the print preview for use with marking engine 152. Print controller 310 therefore edits the rasterized data for the print preview by removing the rasterized images of the inserts from the rasterized data. Print controller 310 then instructs marking engine 152 to print the job and insert the inserts using the modified version of the rasterized data from the print preview.

In another embodiment, memory 340 of printer 300 comprises a memory component that is accessible via a network. In this example, memory 340 provides image data to multiple print controllers operating on multiple printers. When a print controller (e.g., print controller 310) reviews job ticket information, it acquires a network address (e.g., a Uniform Resource Locator (URL)) indicating the location of image data for a given insert at memory 340. The print controller then accesses the appropriate location in memory 340 using the network address. In this embodiment, print controller 310 may use intermediaries such as a modem, etc. in order to access memory 340.

In a further embodiment, print controller 310 acquires user input in order to select which image to use for an insert. For example, print controller 310 may query a user by providing a set of available inserts to display device 130. User I/F 140 may then be used to indicate a selection of an insert currently loaded at printer 300. Note that the set of available inserts may be provided as text or images. If images are presented to the user, the images may be downsampled versions or "thumbnails" of the full resolution rasterized versions of images for the inserts.

Figure 4:
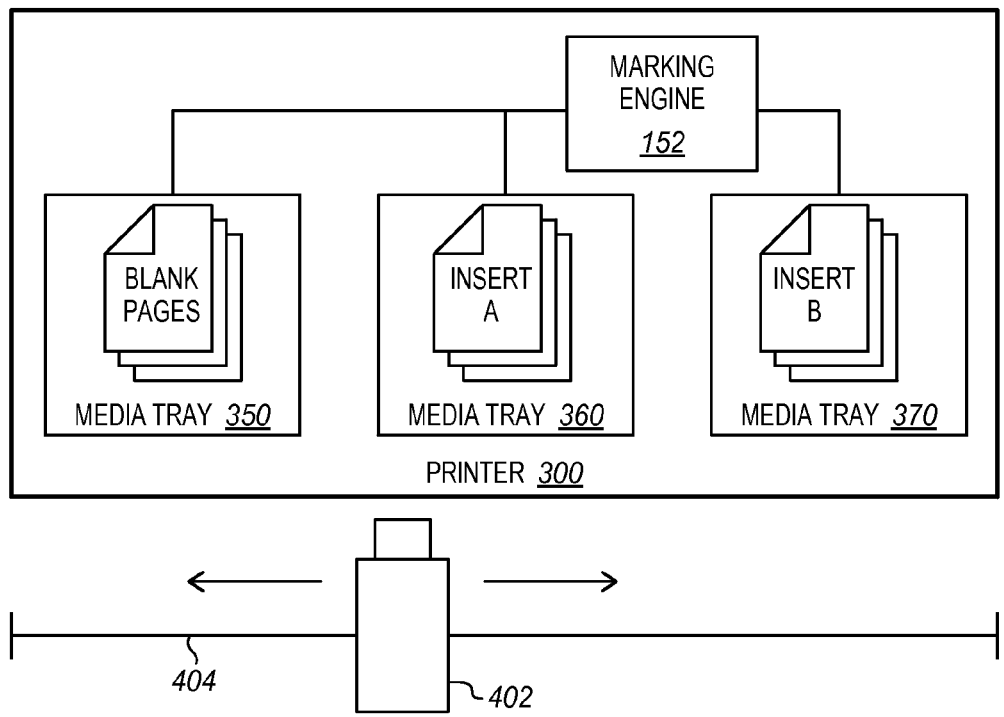
FIG. 4 is a block diagram of a printer including an imaging device for capturing images of inserts in an exemplary embodiment.

FIG. 4 is a block diagram of a printer 300 including an imaging device 402 for capturing images of inserts in an exemplary embodiment. In this embodiment, imaging device 402 comprises a scanner or camera. Imaging device 402 may be aligned to capture images of the inserts as they reside at media trays of printer 300, and these images may be used to update a memory of printer 300. In one embodiment, imaging device 402 is placed on a track 404 for lateral motion, so that imaging device 402 may be used to capture images of inserts stored at a variety of different media trays.

Figure 5:
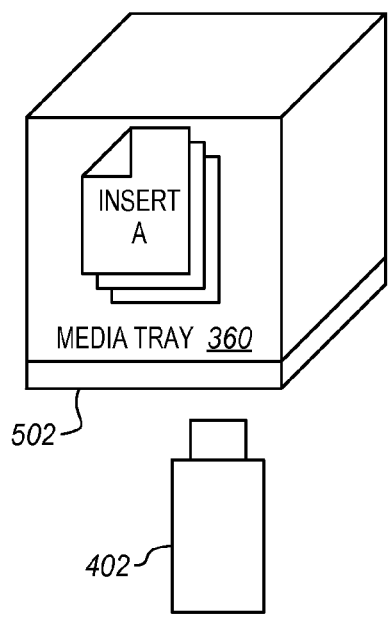
FIG. 5 is a block diagram of an imaging apparatus aligned with a transparent underside of a media tray of a printer in an exemplary embodiment.

FIG. 5 is a block diagram of an imaging device 402 aligned with a transparent underside 502 of a media tray 360 of a printer 300 in an exemplary embodiment. In this embodiment, imaging device 402 is placed underneath media tray 360 and captures images of the inserts through transparent underside 502. Transparent underside 502 may comprise clear glass, plastic, an air gap, etc. The captured images may then be used to update a memory such as memory 340 of printer 300 in FIG. 3. The captured images may also be used to update a console of the printer or host software, so that whenever the printer is selected at a user interface, images of the stored inserts located at the printer's trays are provided to the user at a display device. Furthermore, there may be a display device located at each tray of the printer so as to show a user of the printer images of the inserts that are currently stored. These display devices could indicate further information such as paper dimensions, number of sheets remaining, type of paper, weight of paper, color of paper, etc.

In a further embodiment, imaging device 402 comprises an integrated scanner of a printer. The printer is capable of drawing an insert from a tray and scanning it with the integrated scanner. This scanned image may then be used to update a memory of the printer. The scanned insert itself may then be placed back into the appropriate tray or discarded by the printer.

These images in the memory may be updated in a number of other ways. For example, a user may update the image information by altering the memory directly. In another example, a printer may acquire a print job (e.g., an Intelligent Printer Data Stream (IPDS)) that includes non-printing pages. The printer may rasterize these non-printing pages and then store the rasterized pages in memory as insert images. Note that in this scenario, it would be important for an available insert at the printer to match the images of non-printing pages provided in the print job. Otherwise, there would be a potential mismatch between the print preview and the output of the printer.

In a further example, it may be desirable for the memory to be checked for duplicate images of inserts. If an image to be stored has a name, URL, or other tag that matches another image of an insert stored in memory (or if two images stored in memory appear substantially similar), the preview system may provide a warning to the user indicating that there is a duplicate image already existing within the memory. The user may then confirm that they want the duplicate image, or may refrain from storing the image at the memory.

Figure 6:
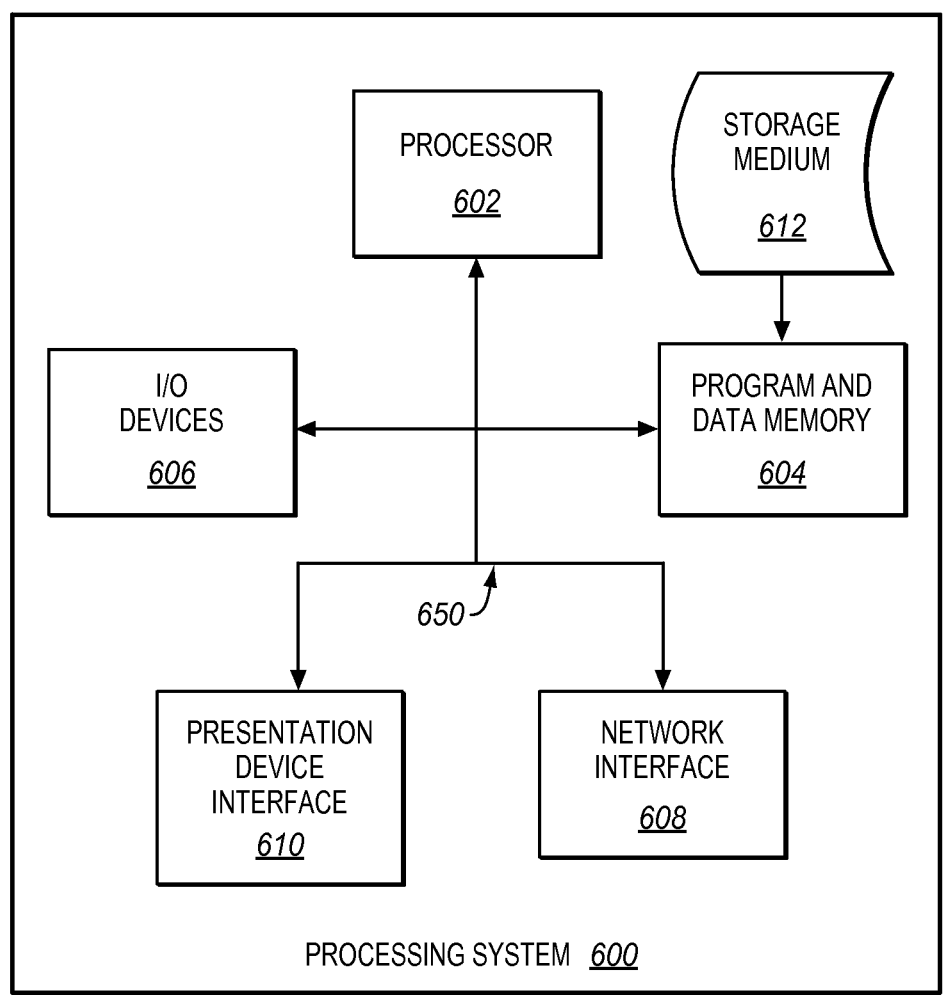
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be integrated with the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A system comprising:
a controller operable to receive a print job, to receive a request for a print preview of the print job, and to rasterize logical pages of the print job to generate sheet images for the print preview of the print job;
the controller further operable to identify physical inserts that will be integrated with printed pages of the print job and that include pre-printed content, to acquire sheet images of the physical inserts, wherein the sheet images of the physical inserts include the content, and to include the sheet images of the physical inserts with the sheet images of the print job within the print preview, by placing the sheet images of the physical inserts within the print preview at page locations where the physical inserts will be integrated within the print job.

2. The system of claim 1 wherein:
the controller is further operable to review a job ticket of the print job to determine the page locations to place the physical inserts among the printed pages of the print job, to correlate the determined page locations with the sheet images of the inserts, and to place the sheet images of the inserts at the determined page locations.

3. The system of claim 1 wherein:
the controller is further operable to identify the physical inserts by reviewing a job ticket of the print job to find names for the physical inserts.

4. The system of claim 1 wherein:
the controller is further operable to acquire the sheet images of the physical inserts from a print server.

5. The system of claim 1, wherein:
the controller is further operable to query a user to select the physical inserts, wherein the query includes thumbnail images of physical inserts that are available for selection.

6. The system of claim 1 wherein:
the controller is further operable to access a memory including Page Description Language (PDL) data for the identified physical inserts, and to rasterize the PDL data to generate the sheet images of the physical inserts.

7. The system of claim 1 further comprising:
an imaging device operable to capture the sheet images of the physical inserts as they reside at a printer.

8. The system of claim 7 wherein:
the imaging device is aligned with a transparent underside of a container for the physical inserts,
the imaging device operable to capture the sheet images of the physical inserts through the transparent underside of the container.

9. A non-transitory computer readable medium embodying programmed instructions which, when executed by a processor, are operable for performing a method comprising:
receiving a print job;
receiving a request for a print preview of the print job;
rasterizing logical pages of the print job to generate sheet images for the print preview of the print job;
identifying physical inserts that will be integrated with printed pages of the print job and that include pre-printed content;
acquiring sheet images of the physical inserts, wherein the sheet images of the physical inserts include the content; and
including the sheet images of the physical inserts with the sheet images of the print job within the print preview, by placing the sheet images of the physical inserts within the print preview at page locations where the physical inserts will be integrated within the print job.

10. The medium of claim 9 wherein the including comprises:
reviewing a job ticket of the print job to determine the page locations to place the physical inserts among the printed pages of the print job;
correlating the determined page locations with the sheet images of the physical inserts; and
placing the sheet images of the physical inserts at the determined page locations.

11. The medium of claim 9 wherein:
identifying the physical inserts comprises reviewing a job ticket of the print job to find names for the physical inserts.

12. The medium of claim 9 wherein:
acquiring the sheet images of the physical inserts comprises acquiring the sheet images of the physical inserts from a print server.

13. The medium of claim 9 wherein the method further comprises:
querying a user to select the physical inserts, wherein the query includes thumbnail images of physical inserts that are available for selection.

14. The medium of claim 9 wherein the including comprises:
accessing a memory including Page Description Language (PDL) data for the identified physical inserts; and
rasterizing the PDL data to generate the sheet images of the physical inserts.

15. The medium of claim 9 wherein the method further comprises:
capturing, with an imaging device, the sheet images of the physical inserts as they reside at a printer.

16. The medium of claim 15 wherein the method further comprises:
aligning the imaging device with a transparent underside of a container for the physical inserts so as to capture the sheet images of the physical inserts through the transparent underside of the container.

17. A method comprising:
receiving a print job;
receiving a request for a print preview of the print job;
rasterizing logical pages of the print job to generate sheet images for the print preview of the print job;
identifying physical inserts that will be integrated with printed pages of the print job and that include pre-printed content;
acquiring sheet images of the physical inserts, wherein the sheet images of the physical inserts include the content; and
including the sheet images of tile physical inserts with the sheet images of the print job within the print preview, by placing the sheet images of the physical inserts within the print preview at page locations where the physical inserts will be integrated within the print job.

18. The method of claim 17 wherein the including comprises:
reviewing a job ticket of the print job to determine the page locations to place the physical inserts among the printed pages of the print job;
correlating the determined page locations with the sheet images of the physical inserts; and
placing the sheet images of the physical inserts at the determined page locations.

19. The method of claim 17 wherein:
identifying the physical inserts comprises reviewing a job ticket of the print job to find names for the physical inserts.

20. The method of claim 17 wherein:
acquiring the sheet images of the physical inserts comprises acquiring the sheet images of the physical inserts from a print server.

* * * * *